United States Patent [19]
Purcell

[11] 3,977,978
[45] Aug. 31, 1976

[54] SEPARATION CHAMBER, HOLDING TANK, DRAINAGE SYSTEM

[76] Inventor: Robert M. Purcell, 22 Ronald Lane, Sayville, N.Y. 11782

[22] Filed: Feb. 3, 1975

[21] Appl. No.: 546,402

[52] U.S. Cl. .............................. 210/521; 210/532 S
[51] Int. Cl.² ......................................... B01D 21/00
[58] Field of Search ......... 210/521, 522, 532, 532 S

[56] References Cited
UNITED STATES PATENTS

| | | | |
|---|---|---|---|
| 2,793,186 | 5/1957 | Dunell et al. ......................... | 210/521 |
| 3,057,796 | 10/1962 | Davis .............................. | 210/532 S |
| 3,240,343 | 3/1966 | Werner ............................ | 210/532 S |
| 3,451,553 | 6/1969 | Davis ............................. | 210/532 S |

*Primary Examiner*—John Adee

[57] ABSTRACT

A superimposed separation chamber, holding tank and drainage system is formed by building up modular interfitting units to form a drainage system, holding tank, and separation chamber disposed one over the other. One or more drainage rings; open at their tops and bottoms and each with a number of large apertures through their walls are stacked to form the drainage system. A cone shaped louver, also open top and bottom, is fitted in each drainage ring. The holding tank is stacked on top of the uppermost drainage ring to separate the drainage system from the septic tank and is formed with a sludge accumulating basin. One or more annular separation chambers is then stacked on top of the holding tank. Each annular separation chamber is subdivided by a plurality of divider walls each decreasing in height in a predetermined fluid flow direction, and with every other one of said divider walls provided with an upwardly angled pipe.

13 Claims, 9 Drawing Figures

SEPARATION CHAMBER, HOLDING TANK, DRAINAGE SYSTEM

BACKGROUND OF THE INVENTION—FIELD OF APPLICATION

This invention relates to combined holding tanks/drainage units, and separation chambers and more particularly to a separation prior to drainage.

BACKGROUND OF THE INVENTION—PRIOR ART

A significant area of the country lacks municipal sewage collecting facilities and instead must rely upon septic tanks, cesspools and leeching fields.

The septic tank receives the sewage so that the heavy material and sludge accumulates at the bottom where it is acted upon by bacteria. The fluid which accumulates on top of the sludge and heavy material must run off and be absorbed into the surrounding soil.

Quite often double tank units are provided, the first to receive the sewage, the second to receive the fluid after it accumulates to a predetermined height in the first tank. In such a set-up the second tank unit is apertured and/or without a bottom so that the fluid can leech out into the surrounding soil.

However, considerable problems are created as the porosity of the soil diminishes. The greater the clay content of the soil the less porous it is and the more difficult it becomes to obtain good leeching and drainage.

Some prior art systems compensate for the slow absorption rate of the surrounding soil by increasing the tank size but this results in increased tank cost, and extra expense in digging the hole in the ground into which the tank must fit.

The use of leeching fields, stretching out into the surrounding soil, has been effective to reduce the size of tanks in soils with poor fluid absorption. But, here again great effort and expense is required to provide such leeching fields. In addition a large amount of real estate is required for such leeching fields; and, depending upon the part of the country, this too can be a significant if not prohibitive expense.

Other prior art devices have attempted to solve the size and space problem by providing compact units such as that shown in U.S. Pat. 2,911,102 to D. Clonchi; but the complexity of the unit adds considerably to its price and to the efforts required to pump out the sludge; as must be done from time to time.

Still other prior art units combine the septic tank and cesspool functions into superimposed units as shown in U.S. Pat. No. 3,097,166 to A. A. Monson, and into interfitting units as shown in U.S. Pat. No. 3,240,343 to E. Werner.

However, these units are so large and heavy as to be cumbersome and difficult to handle; quite often requiring special equipment to transport them to the sight and deposit them in the hole in the ground.

SUMMARY OF THE INVENTION

It is therefore an object of this invention to provide a new and improved separation chamber, holding tank, drainage system.

It is another object of this invention to provide a new and improved superimposed separation chamber, holding tank, drainage system.

It is a further object of this invention to provide a new and improved superimposed separation chamber, holding tank, drainage system which is assembled from stackable modular units.

It is still another object of this invention to provide a new and improved modular separation chamber.

This invention involves a superimposed separation chamber, holding tank, drainage system; and contemplates forming same from interfitting, and modular units which are stacked one on top of the other to form a drainage system covered by a holding tank and topped off by one or more annular separation chambers.

Other objects, features, and advantages of the invention, in its details of construction and arrangement of parts, will be seen from the above, from the following description of the preferred embodiment when considered in conjunction with the drawings, and from the appended claims.

DESCRIPTION OF THE PREFERRED EMBODIMENT

For convenience the invention will described as applied to separation chamber, holding tank, drainage system formed from modular units cast in concrete with a generally circular cross section and adapted to be stacked one over the other with a pair of drainage rings on the bottom and a pair of annular separation chambers on top; it being understood nevertheless; that the combination may be formed in whole or in part from other suitable materials; that the cross sectional configuration need not be circular but can be rectangular, square or any other appropriate and convenient shape; that if sufficient only one drainage ring need be used or if required more then two such rings can be used; and that only one annular separation chamber may be used instead of two if sufficient to do the job.

Figure 1:
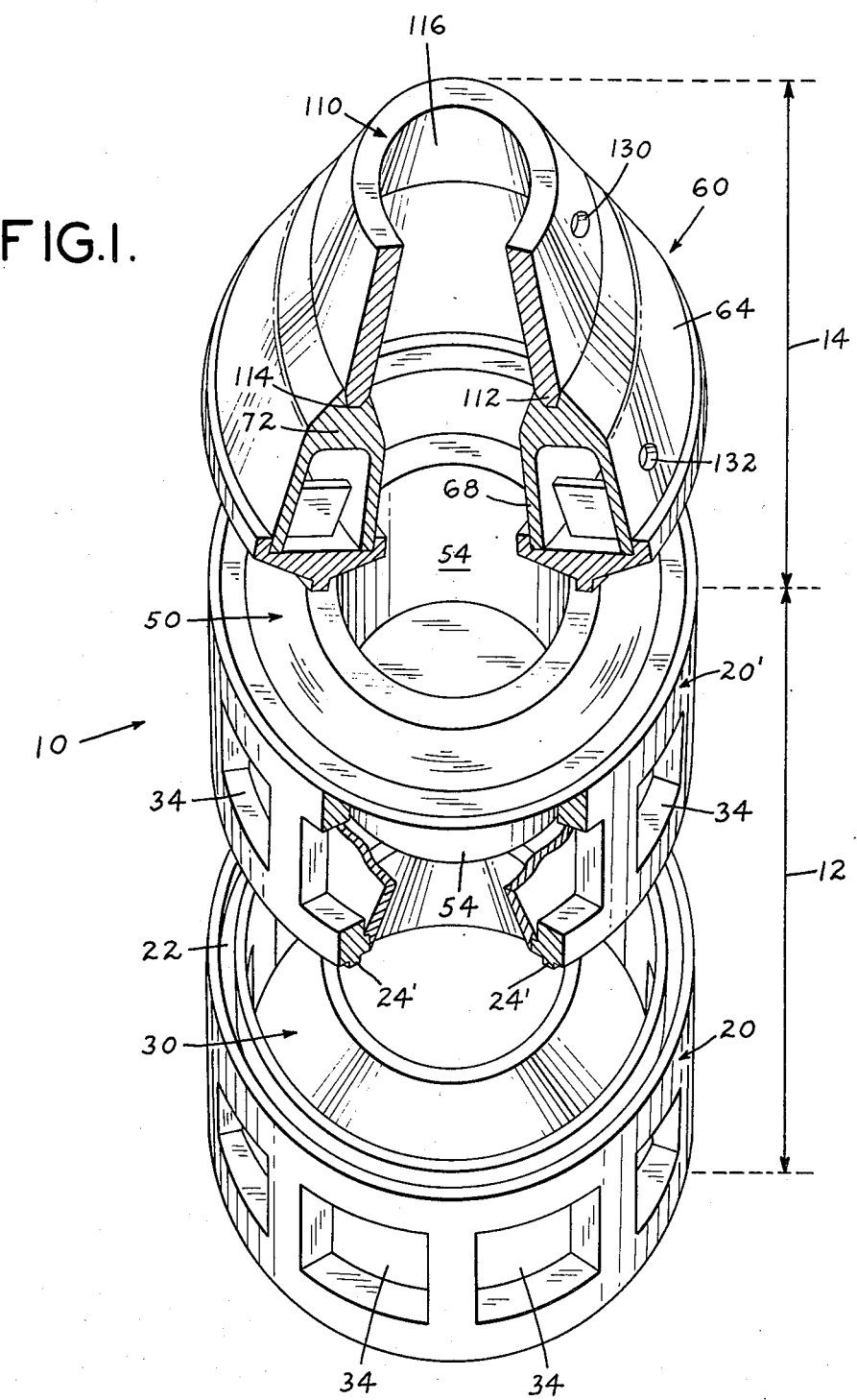
FIG. 1 is an exploded perspective view of a combined separation chamber, holding tank and drainage system incorporating the instant invention.

With reference to FIG. 1 there is generally shown at 10 a combination including a drainage assembly 12, and a septic tank assembly 14.

Figure 2:
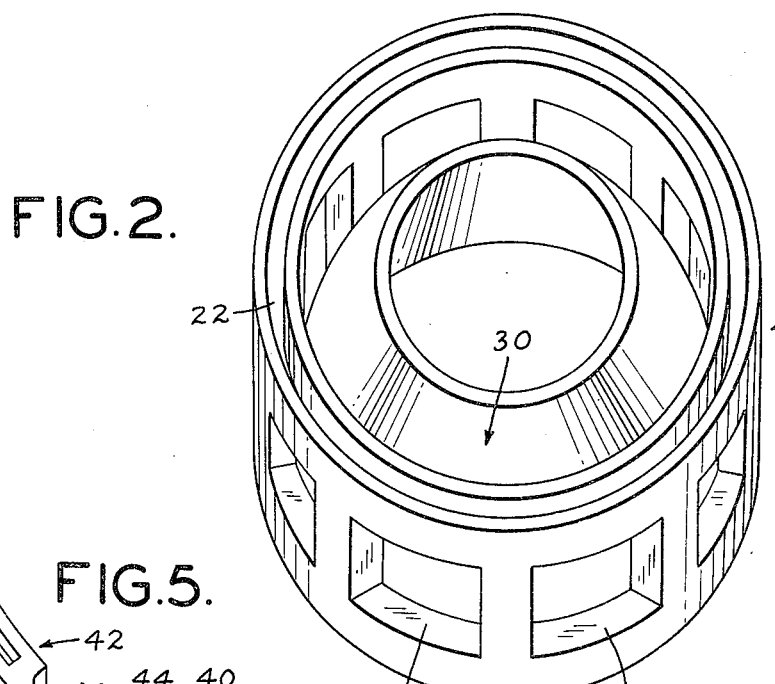
FIG. 2 is a perspective view of a drainage ring for the drainage portion of the combination of FIG. 1.

Drainage assembly 12 includes a first or bottom drainage ring 20 (FIGS. 1 and 2) and a second or upper drainage ring 20' (FIG. 1). Each ring 20, 20' is formed from cast concrete so as to be open top and bottom; and so as to include a groove 22 (FIGS. 1 and 2) along the upper edge thereof and a tongue 24' along the bottom edge thereof adapted to fit into groove 22 to faciliate stacking of rings 20, 20'.

Figure 3:
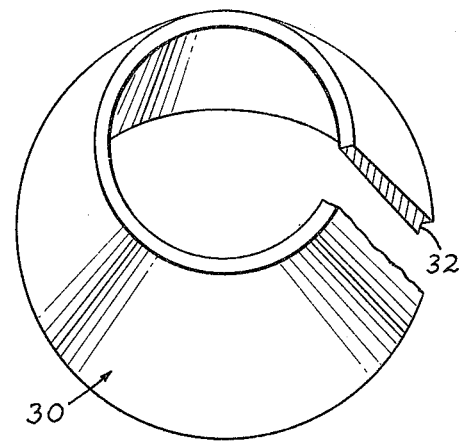
FIG. 3 is a perspective view of the cone shaped louver adapted to fit within the drainage ring of FIG. 2.
Figure 4:
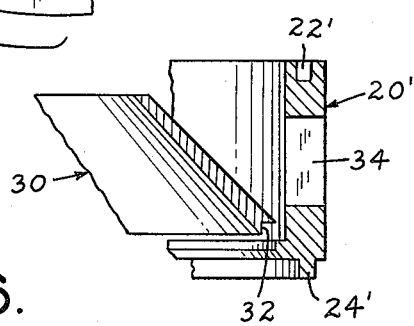
FIG. 4 is a fragmentary sectional view showing how the cone of FIG. 3 fits within the drainage ring of FIG. 2.

A cone shaped louver 30 (FIGS. 1 and 3), also cast in concrete with an open top and bottom, is formed to fit within drainage rings 20, 20'. The fit is facilitated by forming a shoulder 32 (FIG. 4) along the bottom rim of louver 30 and a lip proximate the bottom of rings 20, 20'. When so positioned louver 30 acts as a baffle for apertures or windows 34 formed around the periphery of drainage rings 20, 20' and so as to extend through the walls thereof.

Figure 5:
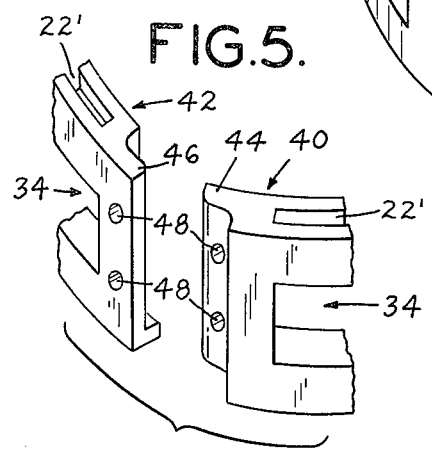
FIG. 5 is a fragmentary perspective view showing the interfitting between sections of the drainage ring of FIG. 2.

Drainage rings 20, 20', and accordingly cone shaped louvers 30, may be formed to a diameter depending upon the intended capacity of the system. If the diameter gets large rings 20, 20' may be quite heavy and it may be advantageous to cast same in sections. As such each such section, as shown for sections 40 and 42 of FIG. 5, would be best formed with interfitting lips 44, 46 adapted to mate one with the other. If desired provision may be made for pinning sections 40 and 42 together as at 48.

Figure 6:
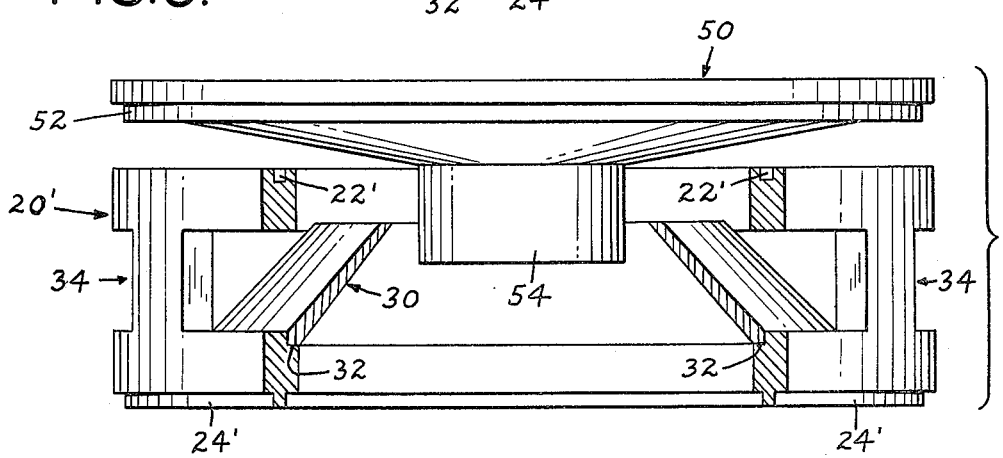
FIG. 6 is a side elevation showing a holding tank exploded over a drainage ring which is cut away in part to better show details thereof.
Figure 7:
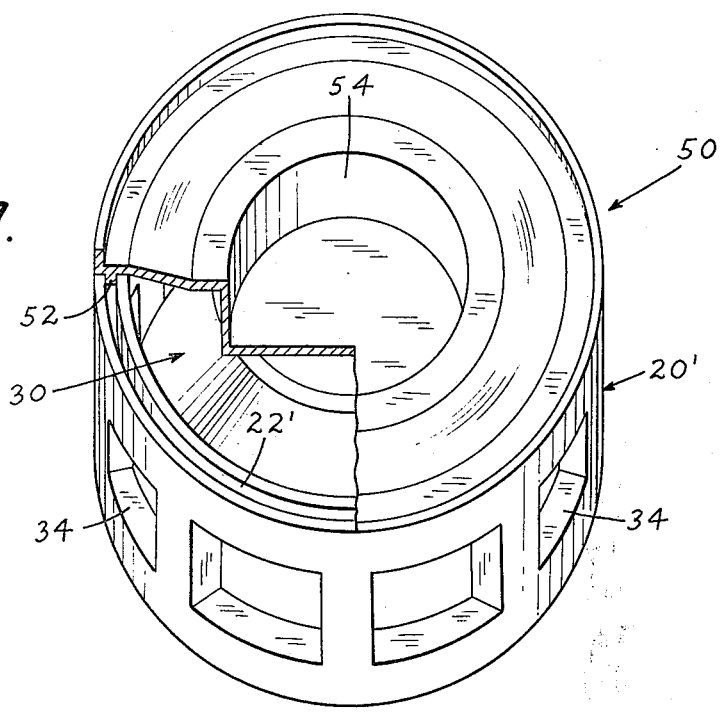
FIG. 7 is a perspective view of the holding tank in position on a drainage ring, cut away in part to better show the details thereof.

A holding tank assembly 50 (FIGS. 1, 6 and 7), cast in concrete to the same diameter as rings 20, 20', is formed with a funnel like configuration and with a tongue 52 adapted to mate in groove 22' of upper drainage ring 20'. Holding tank assembly 50 forms a cover for cesspool assembly 12 (FIG. 1) and a bottom for septic tank assembly 14 separating one from the other.

A sludge basin 54, of generally circular configuration and a predetermined depth, is formed in the center of the holding tank assembly 50.

Figure 8:
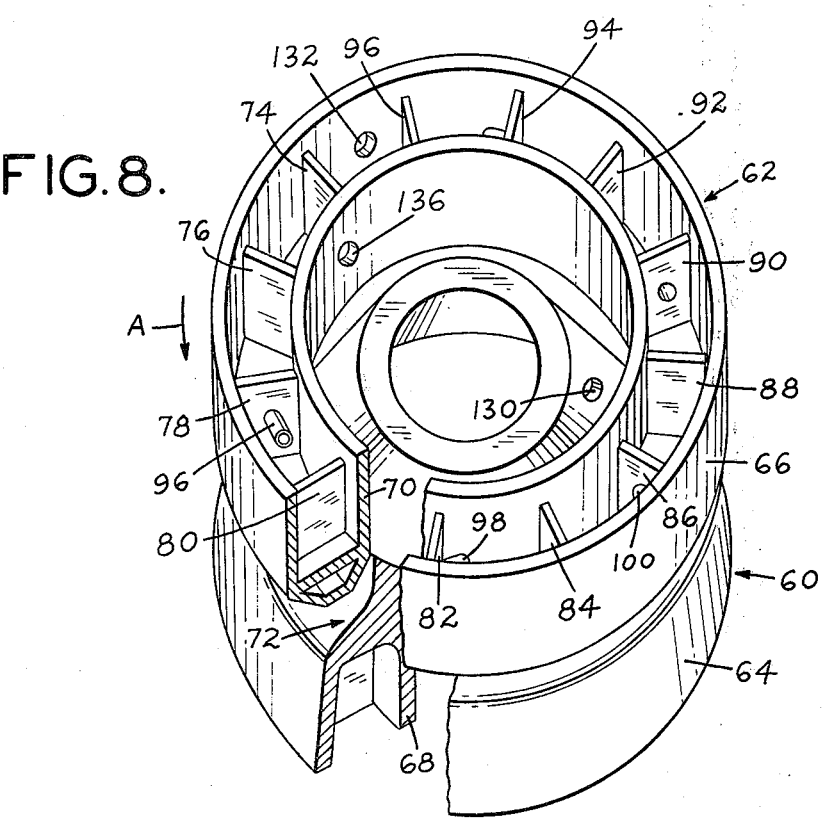
FIG. 8 is a perspective view of the annular separation chamber of FIG. 1 topped off with an overflow annular separation chamber and cut away in part to better show the details thereof.

A lower or first separation chamber 60 (FIG. 8), is stacked on top of holding tank assembly 50 and is in turn adapted to receive an upper or second separation chamber 62. Each separation chamber 60, 62 is cast in concrete with a generally annular configuration having outer walls 64, 66 respectively and inner walls 68, 70 respectively. An upper wall 72 (FIGS. 1 and 8) may be integrally cast to span walls 64, 68 of separation chamber 60 or any suitable cast cap (not shown) may be fitted thereover.

Figure 9:
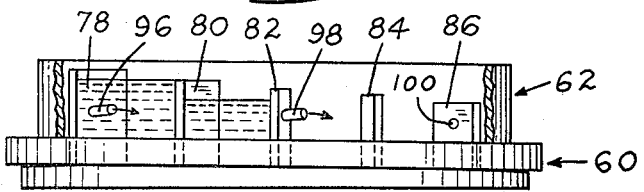
FIG. 9 is a schematic showing of the fluid flow in the separation chamber of FIG. 8.

Each annular separation chamber 60, 62, is subdivided into a number of sections by divider walls 74, 76, 78, 80, 82, 84, 86, 88, 90, 92, 94 and 96. Divider walls 74–96 decrease in height progressively in the direction of arrow A, with each alternate divider wall 78, 82, 86, 90 and 94 provided with an upwardly directed pipe 96, 98, and 100 respectively (FIG. 9).

A cone shaped cap 110 (FIG. 1) also cast in concrete is formed with a tongue 112 adapted to fit in a groove 114 formed in expansion chamber 60. A cover (not shown) should be provided to cover access hole 116 provided in the top of cap 110.

A suitable aperture 130 extends through cap 110 and is adapted to receive a suitably sized pipe (not shown) provided to direct the sewage into septic tank assembly 14 of septic tank/cesspool unit 10.

An aperture 132 extends through outer wall 64 of separation chamber 60 and is adapted to receive one end of a suitably sized pipe (not shown) which will direct the fluid exiting from separation chamber 60 into one of the aperture 34 of rings 20, 20'. Another aperture 136 (FIG. 8) extends through inner wall 70 of separation chamber 62.

In utilizing unit 10 a suitably sized hole is dug in the ground, and a bed is prepared at the bottom thereof. Lower drainage ring 20 is set therein and a cone shaped louver 30 is fitted in place in ring 20.

Upper drainage ring 20' is then stacked upon lower drainage ring 20 with tongue 24' of ring 20' seated in groove 22 of ring 20. A cone shaped louver 30 is then fitted in drainage ring 20'. This process continues until a suitable number of drainage rings 20, 20' are stacked one upon the other.

Holding tank assembly 50 is next set upon the upper most drainage ring 20, 20' with its tongue 52 (FIG. 6) set in groove 22'. One or more annular separation chambers 60, 64 are then stacked upon holding tank assembly 50. Cap 110 is then fitted thereover and opening 116 of cap 110 closed by suitable cover means (not shown). An inlet sewer pipe is connected to aperture 130 and suitable piping is provided from aperture 132 of separation chamber 60 into an aperture 34 of drainage ring 20 or 20'.

Any space left around the assembled unit 10 to facilitate assembly thereof is then filled up with soil and the entire unit covered over.

As sewage enters septic tank assembly 14 through aperture 132 it falls into basin 54 of holding tank assembly 50 where conventional bacterial action takes place. With time fluid will build up in septic tank assembly 50 with solids and sludge accumulating at the bottom thereof in basin 54. As the fluid level rises to that of aperture 136 the fluid will flow into a first section of annular separation chamber 62 between divider walls 74 and 76 thereof. As the fluid builds up in this first section, of separation chamber 62, a turbulence will be produced when the fluid flowing through the pipe (not shown) extending through aperture 136 rises to a level higher then that of said pipe. When the rising fluid level reaches the top of divider wall 76 it will flow over same and into a second section of separation chamber 62 between divider walls 76 and 78. Since divider wall 74 is higher then divider wall 76 the fluid will be prevented from flowing into an outlet section, disposed between divider walls 96 and 74, of separation chamber 62.

The fluid will build up in said second section of separation chamber 62 until it first flows through an upwardly directed pipe 96 disposed in divider wall 78. The fluid flowing through pipe 96 flows into a third section of separation chamber 62 between divider walls 78 and 80 thereof. The fluid in separation chamber 62 will thus build up in each section until it flows over the lower wall thereof. In each such section provided with an upwardly extending pipe the fluid will flow into the next section through the pipe.

The process of fluid building up in one section and rising over an upwardly extending pipe, and flowing over a divider wall that is lower then the first is called one complete cycle, and the separation works in this way: the fluid rising in upwardly extending pipe 96 in divider wall 78 (FIG. 9), keeps floating particles in the section between divider walls 76, 78. This also includes grease and detergents. The fluid rising in the third section (between divider walls 78, 80) produces a turbulence, by the fluid rising higher then the upwardly extending pipe 96, which keeps the partially floating particles, that otherwise hand suspended, from floating over the lower divider wall 80.

The aforementioned action continues as the fluid progresses around annular separation chamber 62 and/or will continue through the lower annular separation chamber 60.

By the time fluid leaves a separation chamber it is substantially clear of floating solids. The fluid will flow through aperture 132 into a suitable pipe (not shown) and down into cesspool assembly 12. Once in cesspool assembly 12 the fluid can leech into the surrounding soil either through the open bottom of lower drainage ring 20 or through aperture 34 provided in rings 20, 20'.

It should be understood that a holding tank or septic tank of the type disclosed may be enlarged simply by placing a holding tank 50 (FIG. 6) between any two rings 20. Rings 20 may be provided having interfitting means but without apertures 34. A tank 50, ring 20, and separation chamber 60 may obviously be made according to required specifications.

In addition a holding tank 50/separation chamber 60 combination may be completely seated by suitable means and partially exposed to the surface. Appropriate covers should be provided for easy removal of sediment. In some cases sealed tanks may be provided to catch a liquid runoff exiting from a partially exposed separation chamber 60.

If desired more then one upwardly extending pipe may be used in the divider walls of the separation chambers; and the inner and outer walls thereof (entering and exiting) may also be provided with more then one pipe.

From the above description it will thus be seen that novel and improved septic tank/cesspool, and novel and improved separation chamber/holding tank, combinations have been provided; which combinations utilize a plurality of cast modular units which may be cast to a size relatively easy to handle to facilitate disposition and assembly and which are stackable one on top of the other to form the desired combination.

I claim:

1. A combined separation chamber holding tank and drainage system comprising:
   a. at least one drainage ring of predetermined height and circumferential configuration;
   b. at least one drainage ring aperture extending through said drainage ring;
   c. a holding tank assembly of predetermined height and having a circumferential configuration proximating that of said drainage ring;
   d. said holding tank assembly further being formed so as to be readily positioned upon said drainage ring and so that once so positioned it forms a closed top for said drainage ring;
   e. said holding tank assembly further being formed to provide closed receptacle means;
   f. at least one annular separation chamber of predetermined height and having a circumferential configuration proximating that of said holding tank assembly and drainage ring;
   g. said separation chamber further being formed so as to be readily positioned upon said holding tank assembly and so that as to have an outer wall and an inner wall both of said circumferential configuration and spaced one from the other to form therebetween a chamber;
   h. said inner wall of said chamber and said closed receptacle means of said holding tank assembly forming a sewage receiving receptacle;
   i. a plurality of dividers disposed in spaced relationship one from the other in said chamber to divide same into sections, said dividers spanning said inner wall and said outer walls of said separation chamber but being shorter in height than said predetermined height of said separation chamber; and
   j. conduit aperture means leading into said sewage receiving receptacle from said sewage receiving receptacle into said separation chamber and from said separation chamber into said drainage ring aperture.

2. The system of claim 1 wherein a pair of drainage rings are stacked one upon the other.

3. The system of claim 1 wherein a cone shaped louver is fitted within said drainage ring to co-operate with the aperture provided through the wall thereof to act as a baffle therewith.

4. The system of claim 1 wherein said drainage ring, holding tank assembly and separation chamber are cast from concrete.

5. The system of claim 1 wherein said drainage ring holding tank assembly and separation chamber are respectively formed with tongues and grooves to fit one within the other to facilitate stacking of the items one upon the other.

6. The system of claim 1 wherein said dividers in said annular separation chamber decrease in height in a predetermined direction which also corresponds to the direction of fluid flow in the separation chamber.

7. The system of claim 6 wherein every other one of said dividers in said annular separation chamber is provided with an upwardly directed pipe extending from one side thereof to the other side thereof and upwardly in said predetermined direction.

8. The system of claim 1 wherein said drainage ring, holding tank assembly, and annular separation chamber are of circular cross section.

9. The system of claim 1 wherein said holding tank assembly includes a basin of predetermined width and depth and which is adapted to receive and accumulate sludge from the sewage.

10. The system of claim 1 wherein a cap unit is disposed atop said annular separation chamber to form therewith and along with said holding tank assembly said sewage receiving receptacle.

11. A fluid separation chamber: comprising
    a. a plurality of fluid receiving sections disposed one adjacent the other so that fluid may flow from one such section into the next adjacent one of said sections along a predetermined fluid path;
    b. each of said sections being separated from its adjacent sections by a divider wall;
    c. fluid inlet means leading into one of said sections disposed at a beginning of said predetermined fluid path;
    d. fluid oulet means leading from another of said sections disposed at an end of said predetermined fluid path;
    e. said divider wall between said one section and said another section being a predetermined height with said divider walls between each adjacent section, in the direction of said predetermined fluid path, successively decreasing in height; and f. a divider wall pipe extending through every other one of said divider walls to interconnect the sections on each side thereof;
g. said divider walls and divider wall pipes co-operating with any fluid, which may flow along said predetermined fluid path, such that the fluid will pass into each successive section along said predetermined fluid path by flowing through one of said divider wall pipes or over one of said divider walls creating a turbulence which traps floating particles between divider walls.

12. The fluid separation chamber of claim 11 wherein said plurality of fluid receiving sections form an annulus.

13. The fluid separation chamber of claim 11 wherein said divider wall pipes are directed upwardly.

* * * * *